United States Patent [19]
Anderson

[11] 3,787,982
[45] Jan. 29, 1974

[54] DIRECT READING MEASURING INSTRUMENTS

[76] Inventor: Robert F. Anderson, 3613 13th St., Menominee, Mich. 49858

[22] Filed: Apr. 28, 1972

[21] Appl. No.: 248,539

[52] U.S. Cl. .................................... 33/166, 33/111
[51] Int. Cl. ............................................. G01b 3/18
[58] Field of Search............ 33/166, 164 R, 111, 1 D

[56] References Cited
UNITED STATES PATENTS
2,517,159   8/1950   Allen ................................. 33/111 X
2,718,705   9/1955   Kaufman............................... 33/166

FOREIGN PATENTS OR APPLICATIONS
552,779   4/1943   Great Britain........................ 33/166

*Primary Examiner*—William D. Martin, Jr.
*Attorney, Agent, or Firm*—C. Kenneth Bjork

[57]   ABSTRACT

An improvement in a measuring means for micrometers, verniers and the like, having measuring indicia positioned in a unique manner so as to cooperate during operation to provide fast and accurate direct measurement readings.

5 Claims, 11 Drawing Figures

PATENTED JAN 29 1974

DIRECT READING MEASURING INSTRUMENTS

BACKGROUND OF THE INVENTION

Measuring instruments, such as, for example, micrometer calipers, vernier calipers, and other micrometer and vernier apparatus, are well known and widely used in the machining and manufacturing industries. It is readily apparent to one skilled in the art that under certain conditions of use such measuring instruments may be somewhat difficult to be quickly and accurately read. Accordingly, a number of instrument designs have been proposed which reportedly are to provide for easy reading and high accuracy. For the most part, micrometers, for example, are fitted with mechanical assemblies of a somewhat complicated or bulky nature which are not the most desirable from the users standpoint.

Representative of such micrometers are taught in a number of U. S. Pats., such as for example:

Thielicke (2,691,224) teaches a micrometer having a spindle and counter unit subassembly mounted into a cavity in the frame of the micrometer.

Barrows (2,349,604) relates to a magnifying attachment for precision instruments, particularly a micrometer caliper, which can be applied to the micrometer over the numerals and which magnifies the numerals or inidica to make them easier to read.

Kaufman (2,718,705) teaches a micrometer vernier attachment.

British Pat. 408,512 teaches a micrometer having a plurality of rows of numbers on the thimble but with conventional vertical distance measuring lines on a horizontal datum line on the sleeve.

Other exemplary patents relating to improved micrometers which are designed to provide quick reading and high accuracy are U.S. Pat. Nos. 1,809,404; 2,829,439; 754,106; 2,666,263 and 3,092,913.

Similarly, conventional vernier calipers, veriner height gages, gear tooth vernier calipers, vernier height depth gages and vernier universal bevel protractors are shown in Starrett General Catalog No. 27, published by L. S. Starrett Company, Athol, Massachusetts.

It is a principal object of the present invention to provide an improved micrometer caliper which gives fast and accurate direct reading.

It is another object of the present invention to provide a direct reading micrometer caliper which does not require complicated and/or bulky mechanical attachments.

Another object of the present invention is to eliminate the need for lengthy calculations in making measurment readings using micrometers, verniers and the like instruments.

These and other objects and advantages readily will become apparent from the detailed description presented hereinafter when read in conjunction with the figures of the accompanying drawing.

SUMMARY OF THE INVENTION

Figure 1:
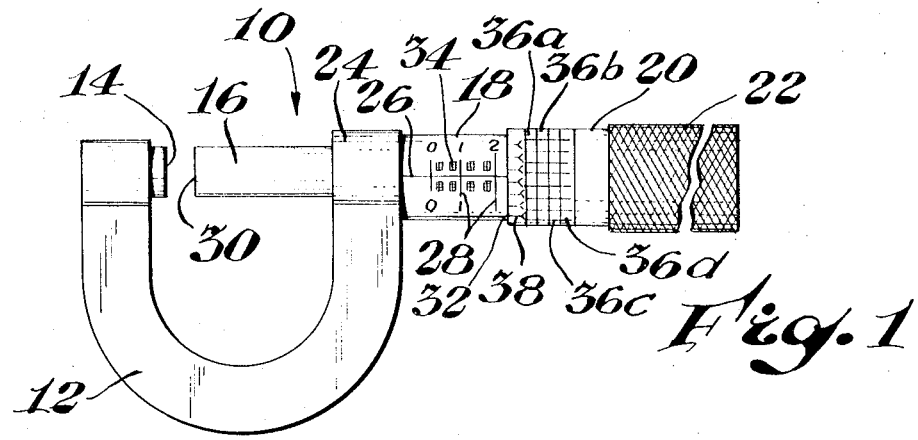
FIG. 1 is a side elevation view of a micrometer employing an embodiment of the present invention.

In general, the present invention is to an improved direct reading means for measuring instruments employing a fixed member having a datum line with spaced apart markings indicating a predetermined distance being measured by the instrument and a movable second member having cooperating measuring indicia. In the present improvement, the second member is fitted with a plurality of rows of numerical markings, each row containing a predetermined number of marked segments of equal size and the total distance measured by a row equalling a known distance on the datum line of the fixed member. The spaced apart markings on the datum line of the fixed member and the rows of numerical markings on the movable member are color-coded or of some other easily visually recognizable cooperating pattern such that the distance measured by a given mark on the datum line is directly related to the corresponding coded row of numbers on the movable second member.

With respect to measuring instruments having a cylindrical shaft, a movable spindle, and a fixed sleeve fitted with spaced apart datum divisions and a rotatable thimble or barrel, such as for example, a micrometer, the present invention comprises a thimble provided around its periphery with a plurality of annular rows of numerical markings, each row containing a predetermined number of marked segments of equal size and the complete circle of each of the rows equalling the total distance measured between predetermined divisions on a horizontal datum line on the sleeve as the thimble is rotated a complete revolution about the sleeve during use of the instrument.

Ordinarily the direct reading means of the present invention as employed with such instruments comprises an improvement in the combination of the sleeve and thimble of a measuring instrument, such as, for example, a micrometer caliper wherein the measuring indicia are positioned in a unique manner and cooperate during operation of the instrument to provide fast and accurate direct measurement readings. More particularly, the sleeve contains a longitudinal datum line having equally spaced apart vertical markings indicating predetermined distances between the anvil and the end of the spindle facing the anvil and spaced apart patterned markers intermediate the vertical markings, each of said markers being of an equal width so as to measure a predetermined distance.

The patterned markers on the sleeve and the rows of numerical markings on the thimble act in cooperation through a color code. Further, each of the numerical markings on the annular rows of the thimble are referenced to a horizontal indicator extending from the forward end of the thimble to the annular rows.

DESCRIPTION OF PREFERRED EMBODIMENTS

The FIGS. of the drawing depict, for illustrative purposes, a number of preferred specie embodiments of the present invention as employed with a number of measuring instruments.

Micrometer calipers of the type depicted by the micrometer 10 of FIG. 1 are well known. Accordingly, there is need only to describe these generally as comprising a U-shaped frame 12 having an anvil 14 at one end, a spindle or screw 16, sleeve 18, and a rotatable thimble or barrel 20 having a knurled cylindrical handle 22. The spindle 16 is journalled in the bearing portion 24 in the second end of the U-shaped frame 12. The other end of the spindle 16 is affixed to the inside of the thimble 20 and is operated so as to move inwardly and outwardly by rotation of the thimble 20 as it is turned on a mating screw thread arrangement (not shown) between the sleeve 18 and thimble 20 in the conventional manner.

It is to be understood that the general description of a micrometer as presented directly hereinbefore is that of a typical conventional micrometer caliper. As is shown in the patents incorporated by reference herein, and as is well known to one skilled in the art, other mechanical modifications can be present. For example, they can be fitted with movable anvils, stops and locking means on the barrel and the like and be of various shapes and styles. The present invention in reading indicia is intended also for use in such modified micrometer calipers.

Figure 2:
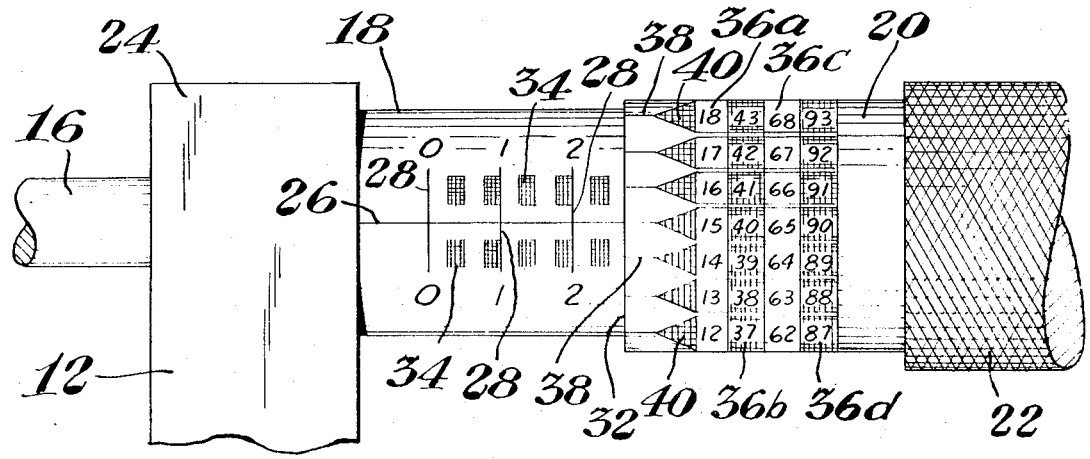
FIG. 2 is a fragmentary, enlarged side elevation of the micrometer depicted in FIG. 1.

Referring specifically to FIGS. 1 and 2, the depicted micrometer is one which is calibrated in inches and measures in units of a thousandth of an inch. In this embodiment, the sleeve 18 contains a longitudinal datum line 26 having spaced apart vertical markings 28. Each of the vertical markings 28 starting from a position nearest the frame 12 carries a digit beginning with zero. These increase incrementally in single integers from marking to marking along the sleeve 18. In this embodiment, the markings 28 are calibrated such that the space between each of the markings represents 0.100 inch, i.e., one hundred thousandths of an inch, distance between the anvil 14 and the face 30 of the spindle 16, the zero digit indicating that face 30 and anvil 16 are in contact when the forward edge 32 of the thimble 20 is on this marking 28.

Intermediate each of the vertical markings 28 are regularly spaced apart identical rectangular patterned markers 34. The markers 34 and the space between are of equal width, each of these representing a distance of 0.025 inch, i.e., twenty-five thousandths inch movement of the spindle 16.

In this preferred embodiment there is cooperation between the sleeve 18 and the thimble 20 employed in combination therewith. The thimble 20 is provided around its periphery with four annular rows of numbers 36a–d containing equal sized segments, each row containing twenty-five digits, one in each segment and numbered consecutively around the row. The first row 36a contains the digits from 1 to 25, the second row 36b has digits 26 to 50, the third row 36c contains the digits 51 to 72, and the fourth row 36d is numbered from 76 to 100. Additionally, the numbers in the rows are referenced to a horizontal line indicator 38 which extends from the forward edge 32 of the thimble 20 back to the rows 36a–d. As readily can be seen from the fragmentary enlarged view of FIG. 2, each of the indicating lines 38 in actuality is joined through a marker 40 with the first row 36a of numbers, but also serves to reference the correspondingly positioned digits in the second, third and fourth rows 36b–d, each of which for a given horizontal position across the four rows shows a number which is twenty-five units higher than the corresponding number in a preceding row.

The line indicators 38 are spaced apart around the periphery of the thimble 20 so as to register one thousandth inch equivalent movement of the spindle between segments.

Each of the rows 36a–d is identified by a color coding corresponding to a marker 34 or equal width spacing between any two of said markers 34 on the sleeve 18; the first row 36a of numbers on the thimble 20 corresponds to the spacing between a vertical marking 28 and the adjacent marker 34 in line toward the next higher vertical marking 28. In the embodiment depicted in FIGS. 1 and 2, the first row of numbers 36a on the thimble has the numbers colored black against a lighter background, the background corresponding in color to the background of the sleeve; in the second row 36b, the numbers are light and the predominant background dark to correspond with the similarly colored marker 34 on the sleeve 18. This pattern is repeated for the third and fourth rows 36c and 36d such that the third row is the same color pattern as the first row 36a and the fourth is the same as the second row 36b.

The ease and accuracy of measurement determinations using this embodiment is readily made during operation and use of the micrometer caliper. As shown in FIG. 2, the micrometer reading is 0.265 inch. As the micrometer caliper 10 is placed and set on an article to be measured, the reading is determined almost instantaneously. The leading edge 32 of thimble 20 is positioned in the spacing following the first marker 34 between vertical markings 28 containing the digit 2 (representing 0.200 inch) and 3 (representing 0.300 inch). From the color coding, it is evident that the third row 36c of numbers is to be used. The horizontal indicator 38 as lined up on the datum line 26 on the sleeve 18 leads back to the horizontal placement of the numbers 15, 49, 65 and 90 in the four rows 36a–d respectively. Clearly the micrometer can only be read to show 0.265 inch spacing between the anvil 14 and the face 30 of spindle 16.

Figure 3:
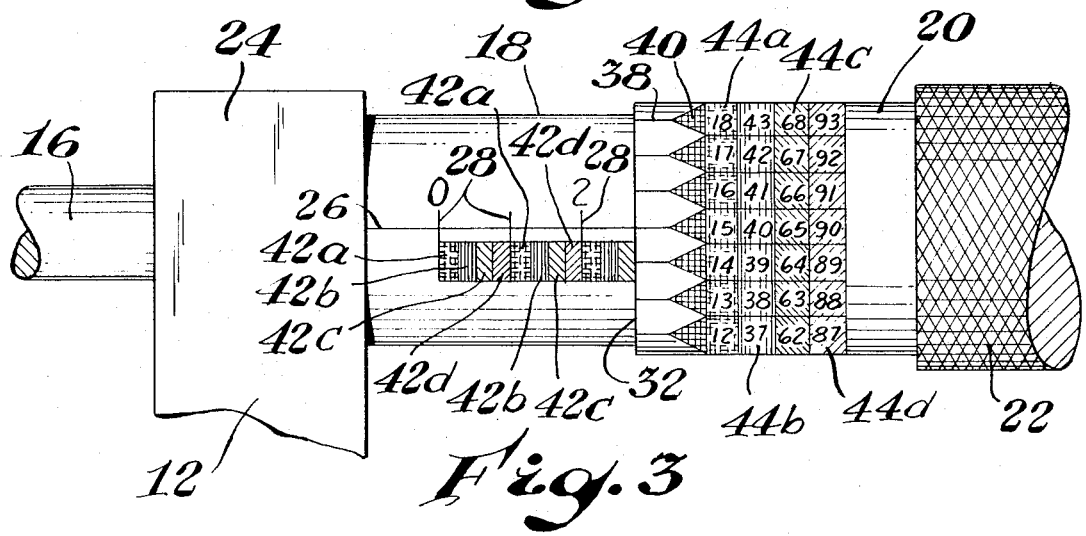
FIG. 3 is an enlarged, fragmentary side elevation of the improved micrometer of the present invention showing another preferred embodiment of the indicia means.

As shown in FIG. 1 and 2, a simple alternating dark and light color coding on the patterned markers, background and rows of numbers has been used in the cooperating indicia. A highly preferred embodiment of the present invention as depicted in FIG. 3 employs multiple color coding where a distinctly different colored marker 42a–d is employed to define each of the twenty-five thousandth inch equivalent spacings between any two adjacent vertical markings 28 on the horizontal datum line 26 on sleeve 18. The corresponding annular rows 44a–d of twenty-five numbered segments on the thimble 20 are color coded in the same order with the same distinct colors. For example, the four equal-width markers 42a–d between each two vertical line markers 28 on sleeve 18 can be yellow, red, green and brown as shown or any other four distinct and separate colors respectively. It is essential that the four markers 42a–d between each two vertical markings 28 of the datum line 26 be in the same order. Each corresponding row 44a–d on thimble 20 bears the same order of colors as markers 42a–d thereby substantially completely eliminating any chance for misleading the micrometer caliper.

Figure 4:
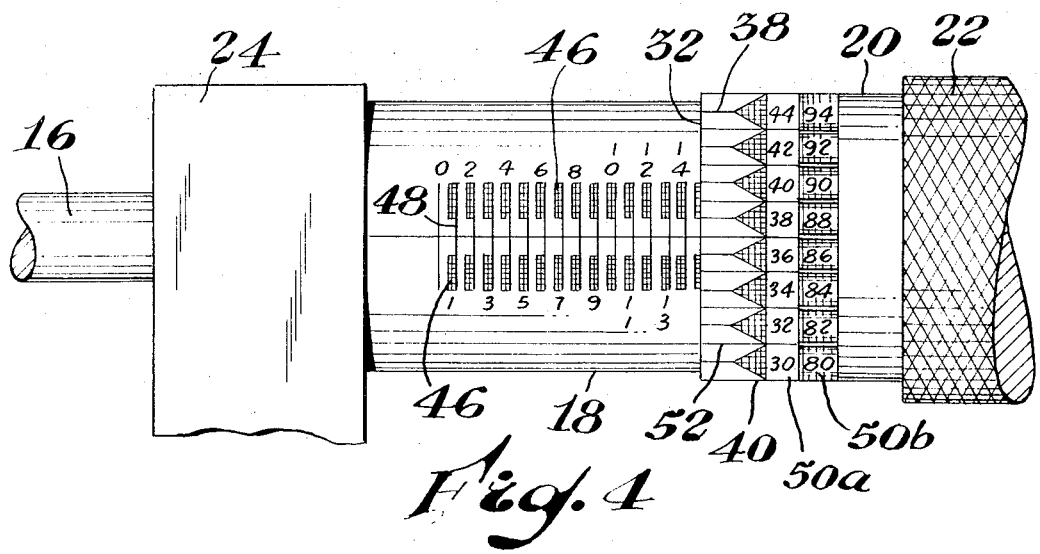
FIG. 4 is an enlarged, fragmentary side elevation of the improved micrometer of the present invention showing an additional preferred embodiment of the indicia means.

The embodiment shown in FIG. 4 is of the same general cooperating indicia as depicted for the embodiment of FIGS. 1 and 2 but represents a micrometer calibrated in millimeters for use in making measurements in the metric system. In this embodiment, because of the relatively smaller unit measurement only one patterned marker 46 and corresponding equal width space are employed between each of the spaced apart vertical line, integer containing markings 48 on the sleeve 18. In this embodiment the distance between each of the vertical integer containing markings 48 is equivalent to one millimeter. Correspondingly, only two annular rows of numbers 50a–b are contained on the thimble 20, each row having twenty-five equal segments such that the complete row 50a or 50b is equivalent to 0.5 millimeter. The segments of the first row 50a are numbered consecutively with even numbers from 2 to 50 and the second row with the numbers from 52 to 100. The horizontal line indicator 38 and marker 40 for each segment in the rows 50a–b is as described for the micrometer caliper embodiment of FIGS. 1 and 2. The metric system indicia embodiment, however, contains a horizontal line marker 52 positioned half-way between each of the horizontal line indicators 38. The line markers 52 give a measurement of the odd number millimeter units between the two even integers for each row.

To show the operation of this embodiment, by following the same technique as described for the embodiment of FIGS. 1 and 2, it is rapidly, accurately and clearly apparent that the micrometer caliper is set to indicate 14.87 millimeters distance between the anvil and the face of the spindle.

The actual fabrication of the present improved micrometer can be carried out in a number of ways. For example, with a two-tone dark and light patterned color coding indicia system the sleeve 18 and thimble 20 can have the numbers, the rows and horizontal and vertical line markings and patterned markers or background areas etched, machined, stamped or otherwise indented and formed therein and the depressions or lowered areas filled with black ink, paint, lacquer, chemical finished or otherwise given a dark coating or finish.

Figure 5:
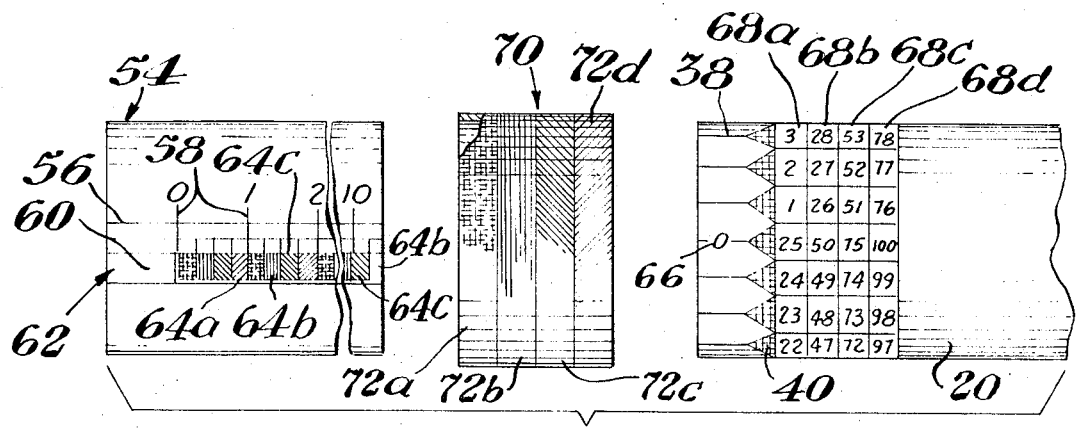
FIG. 5 is an exploded fragmentary, perspective view of an alternative preferred embodiment of the improved micrometer of the present invention.

A particularly effective combination of the improved combination of micrometer sleeve and thimble of the present invention is depicted in the exploded, perspective, fragmentary view of FIG. 5. In this embodiment a sleeve 54 containing a horizontal datum line 56 with vertical numeral marking lines 58 has a horizontal groove 60 formed therein directly below the datum line 56.

An appropriately color coded or patterned indicating strip 62 having an orderly repeating series of characteristic marker divisions 64a–d, as for example of the arrangement described for the embodiment of FIG. 3 is fitted into and fastened into the groove 60. The thimble 20 is fabricated to contain four rows of numbers 68a–d. A transparent sleeve 70 having the same number of bands 72a–d and color coded or patterned in the same order as the marker divisions 64a–d on strip 62 is placed over the rows 68a–d of numbers on the thimble 20 and fastened thereto.

Alternatively, the rows of numbers can be coated with a transparent paint, or lacquer or the numerals can be raised and the background filled or covered with a pigmented coating of the same colors as those of the marker divisions 64a–d on the strip 62.

This embodiment also shows another feature of the present invention. To eliminate confusion and further assure accuracy, the horizontal line indicator 38 corresponding to the rows 68a–d containing numbers 25, 50, 75 and 100 is identified by the number zero 66. Some other distinguishing identifying marking can be employed for this indicator, if desired. This set marker to show the starting point for a measurement usually is employed with all the embodiments of the present invention.

Figure 7:
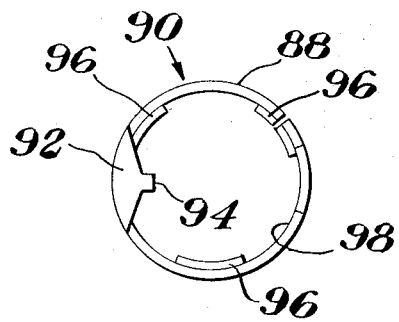
FIG. 7 is an end view of the reader means of FIG. 6.
Figure 6:
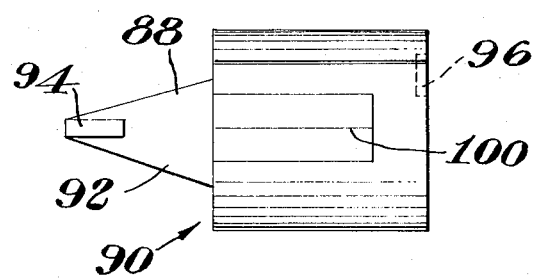
FIG. 6 is a side elevation of a reader means for use with the micrometer of the present invention.

An alternative preferred embodiment of the reading means to assure the correct measurement is depicted in FIGS. 6 and 7. This reading marker 88 consists of a transparent cylindrical thin walled flexible member 90 usually of a synthetic resin having a tapered extension 92 at one end fitted with an inwardly projecting lug 94 at the narrow end of the extension 92. The inside diameter of the cylinder 90 is such that it slidably fits over the thimble 20 of a micrometer. The other end of the cylindrical member 90 is bent inward at 90 degrees around its periphery for a short distance to form a shoulder, e.g., preferably as shown in FIGS. 6 and 7, being a plurality of spaced apart lugs 96, around the inner wall 98 of the member 90. A marker, such as a marker line 100, extends along the length of the cylinder 90 on the side directly opposite lug 94. Ordinarily the cylinder is split along it length so that it can be spread apart for ready insertion over the thimble 20 of a micrometer.

Figure 8:
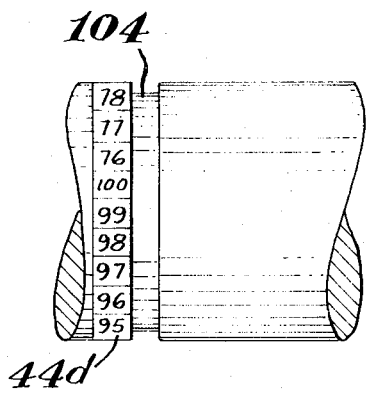
FIG. 8 is a fragmentary side elevation of the thimble micrometer fabricated to accommodate the reader means of FIGS. 6 and 7.
Figure 9:
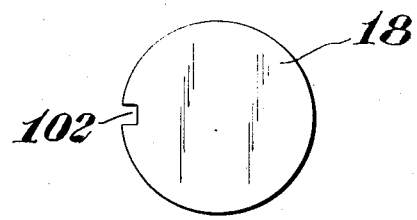
FIG. 9 is a fragmentary end view of the sleeve of a micrometer fabricated to accommodate the reader means of FIGS. 6 and 7.
Figure 10:
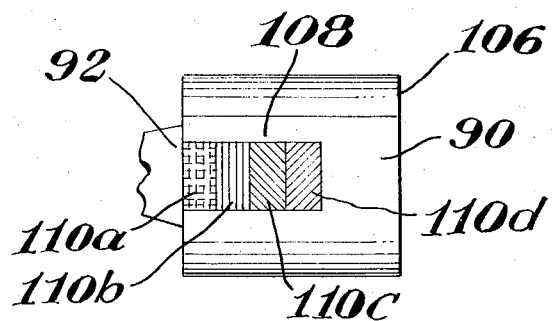
FIG. 10 is a fragmentary side elevation of another embodiment of reader means for use with the improved micrometer of the present invention.

To use this reader with the measuring indicia of the present invention, the sleeve 18 of the micrometer of the configuration of the FIG. 3, for example, is fitted with a keyway 102 along its length usually directly opposite the longitudinal datum line 26 as shown in FIG. 9. The keyway 102 is of a size to slidably engage lug 94. The thimble 20 is fitted with a groove 104 around its periphery at the end of the last row of numbers 44d as shown in FIG. 8. This groove 104 is of a size and depth to accommodate the shoulder or the lugs 96 of the cylinder 90. To place the reader 88 onto the micrometer the cylinder 90 is spread apart and slid over the thimble 20, the lug 94 being positioned into the keyway 102 in the sleeve 18. The shoulder, or lugs 96, are engaged in the groove 104 around the thimble 20 as the cylinder 90 fits into place. When the reader is positioned on the micrometer, the marker line 100 coincides with the datum line 26 of the sleeve. It is not essential that the keyway in the sleeve and its mating lug 94 in the reader 88 be directly opposite the datum line 26. It is only critical that these are matched so that datum line 26 and marker line 100 coincide in an assembled unit.

During the operation of the micrometer, the reader 88 is held in a fixed position as the thimble 20 is rotated because of lug 94 in the keyway 102 of the sleeve. At any given point of measurement only the one horizontal row of numbers from which the measurement is to be read will be under the marker line 100 thus further increasing the absolute accuracy of the present invention.

The above embodiment is made such that the cylinder is of a transparent, usually colorless or clear, material with the marker line 100 being of a contrasting color. It is also to be understood that the reader can be of one color of transparent, translucent or opaque material but having a clear window along its length of a width to expose the horizontal row of the numbers which are indicative of the measurement.

In another embodiment of reader 106 as shown in FIG. 9, the cylinder 90 contains as the marker a window 108 which has color coded bands to match the color coded marking on the sleeve 18 of a micrometer. As shown for exemplary purposes, the reader 106 has four bands 110a–d which correspond to the color coding of the sleeve 18 of the micrometer shown in FIG. 8. In this embodiment, there is no need to provide color coding on the four rows of numbers on the thimble 20.

Figure 11:
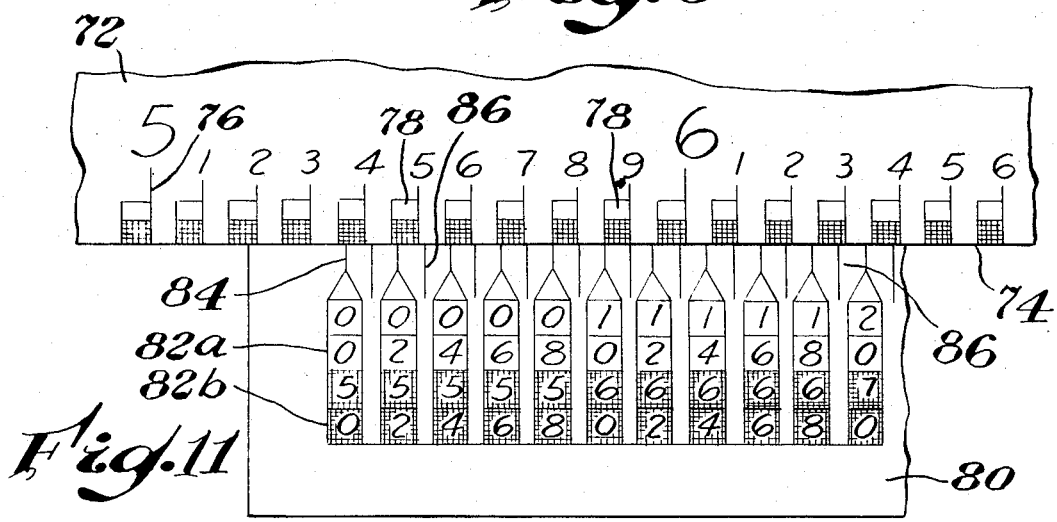
FIG. 11 is a fragmentary top elevation of a vernier caliper or height gage employing the indicia means of the present invention.

Another preferred embodiment of the present invention is exemplified by the direct reading 50 division vernier caliper or height gage as depicted in FIG. 11.

In this embodiment, the fixed member 72 has a longitudinal datum line 74 along one edge having spaced apart numerical markings 76, the distance between any two of these being one inch. Intermediate each of the vertical markings 76 are regularly spaced apart identical rectangular patterned numbered markers 78, the total distance between these being 0.1 inch. These markers 78 and the space between are of equal width, each of these representing a distance of 0.05 inch.

The slidable member 80 contains a double row of equal sized segments 82a – 82b, each row containing twenty-five digits. The segments of the first row 82a are numbered consecutively with even numbers from 0 to 50 and the second row 82b with the even numbers from 50 to 100. Each row has a line indicator 84 for each segment in the rows 82a – 82b. Further, midway between the indicator 84 for each numbered segment, is a line marker 86. These give a measurement for the odd-numbered thousandths of an inch. The slidable member 80 has one more division than the fixed member 72 as in conventional verniers. The advantage of this measuring system is in ease of reading and accuracy as set forth in detail for the micrometer hereinbefore. To illustrate, the present reading is 5.361 inches.

In alternative embodiments, the vernier can contain two rows of numbered segments wherein there are 50 numbered segments per row. Additionally, this system can be used on a curved universal bevel protractor or other vernier devices.

It is to be understood that the various preferred embodiments of the invention as disclosed herein are not meant to be limiting as other modifications of cooperative indicia for use in the improved combination of sleeve and thimble are understood to be within the present invention.

I claim:

1. In a micrometer caliper comprising a frame having a spindle journalled in a bearing portion in the one end of said frame, a sleeve projecting outwardly from this same end of said frame and encompassing said spindle, and the thimble having a handle, said thimble being rotatable about said sleeve and said spindle being attached to said thimble and being moved inwardly and outwardly as said thimble is rotated about said sleeve the improvement which comprises; cooperating patterned indicia on said sleeve and said thimble, said sleeve containing a longitudinal datum line having equally spaced apart vertical markings indicating predetermined measuring distances, and spaced apart patterned markers intermediate said vertical markings, each of said markers being of an equal width, and said thimble provided around its periphery with a plurality of annular rows of numerical markings, each row containing a predetermined number of marked segments of equal size and the complete circle of each row equalling the total distance measured by one of said patterned markers on said spindle as said thimble is rotated a complete revolution about said sleeve during use of said micrometer caliper, said patterned markers on said spindle and said rows of numerical markings on said thimble acting in cooperation through a color code, and each of the numerical markings in said annular rows on said thimble being referenced to a horizontal indicator extending from the forward end of said thimble to said annular rows, and including a reading means, said reading means consisting of a cylindrical thin walled flexible member having a tapered extension at one end fitted with an inwardly projecting lug at its end and the other end of said cylinder defining an inwardly projecting shoulder, the inside diameter of said cylindrical member being such that it slidably fits over the thimble of said micrometer and said shoulder fits into a groove in the thimble of said micrometer, the lug on the extension of said cylindrical member slidably engaging a keyway in sleeve of said micrometer, and said reading means having a marker coinciding with the datum line of said sleeve.

2. The improvement in a micrometer caliper as defined in claim 1 wherein there are four equal width patterned markers between each two adjacent vertical markings on the datum line of said sleeve, each of said markers being equivalent to a measured distance of twenty-five thousandths inch, and the thimble has four annular rows of number containing equal sized segments, each of said segments being equal to one thousandth of an inch movement of the spindle, each row having the segments numbered consecutively, the first row of segments containing the numbers from 1 to 25, the second row of segments containing the numbers from 26 to 50, the third row of segments containing the numbers from 51 to 75, and the fourth row of segments containing the numbers from 76 to 100.

3. The improvement in a micrometer caliper as defined in claim 1 wherein there are two equal width patterned markers between each two adjacent vertical markings on the datum line of said sleeve, each of said markers being equivalent to a measured distance of one-half millimeter, and the thimble has two annular rows of number containing equal sized segments, each of said segments being equivalent to two hundreths of a millimeter, each row having the segments numbered consecutively in even numbers, the first row of segments containing the numbers from 2 to 50 and the second row of segments containing the numbers from 52 to 100, and having an additional horizontal line marker positioned half-way between each of the horizontal indicators extending from the forward end of the thimble to the annular rows.

4. The improvement in a micrometer caliper as defined in claim 1 wherein the patterned markers on the sleeve and the corresponding annular rows of numerical markings on the thimble are in an alternating light and dark color coding.

5. The improvement in a micrometer caliper as defined in claim 1 wherein each of the patterned markers on the sleeve and each of the corresponding annular rows of numerical markings on the thimble are of a distinctly different color than the other of said markers on the sleeve, a given marking on said sleeve and that of a corresponding row of numerical markings on said thimble being of the same color.

* * * * *

O-1050
5/69)

UNITED STATES PATENT OFFICE
CERTIFICATE OF CORRECTION atent No. 3,787,982            Dated    January 29, 1974 nventor(s) Robert F. Anderson

It is certified that error appears in the above-identified patent nd that said Letters Patent are hereby corrected as shown below:

Column 4, line 8, change "72" to --- 75 ---.

Signed and sealed this 9th day of April 1974.

(SEAL)
Attest:

EDWARD M. FLETCHER, JR.           C. MARSHALL DANN
Attesting Officer                Commisssioner of Patents